United States Patent
Zorich et al.

(12)

(10) Patent No.: US 6,341,615 B1
(45) Date of Patent: Jan. 29, 2002

(54) SELF-CLEANING VACUUM PURGE SYSTEM

(75) Inventors: Robert Sam Zorich, Carlsbad; David James Silva, San Diego, both of CA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/660,633

(22) Filed: Sep. 13, 2000

(51) Int. Cl.$^7$ ............................................... G05D 16/20
(52) U.S. Cl. ..................... 137/14; 137/197; 137/341; 137/565.23
(58) Field of Search ....................... 137/14, 197, 341, 137/565.23

(56) References Cited

U.S. PATENT DOCUMENTS

| | | | |
|---|---|---|---|
| 3,601,140 A | 8/1971 | Hooper | 137/107 |
| 3,612,089 A | 10/1971 | Beguiristain | 137/205 |
| 3,827,452 A | 8/1974 | Baumgarten | 137/205 |
| 3,926,143 A | 12/1975 | Hothan | 116/118 R |
| 4,179,769 A | 12/1979 | Lundquist | 15/353 |
| 4,206,632 A | 6/1980 | Suzuki | 73/40.5 |
| 4,221,961 A | 9/1980 | Peyton | 250/223 B |
| 4,244,219 A | 1/1981 | Takahashi | 73/309 |
| 4,297,686 A | 10/1981 | Tom | 340/604 |
| 4,319,232 A | 3/1982 | Westphal et al. | 340/604 |
| 4,596,443 A | 6/1986 | Diemeer et al. | 350/96.23 |
| 4,706,497 A | 11/1987 | Regan | 73/295 |
| 4,925,467 A | 5/1990 | Jordan et al. | 55/430 |
| 5,196,729 A | 3/1993 | Thorngren | 307/118 |
| 5,548,944 A | * 8/1996 | Prochut et al. | 137/171 X |
| 5,764,356 A | 6/1998 | Iwasa et al. | 356/246 |

* cited by examiner

Primary Examiner—Gerald A. Michalsky
(74) Attorney, Agent, or Firm—Geoffrey L. Chase

(57) ABSTRACT

A vacuum purge system is provided to protect the vacuum pump from becoming flooded with liquid that on occasion is purged with vapors from process equipment. The liquid is trapped in a vessel and then evaporated and exhausted through the vacuum pump as vapor. Evaporation of trapped liquid is effected by reducing or stopping the purge stream to the trapping vessel while continuing to operate the vacuum pump, thereby reducing the absolute pressure within the vessel. Evaporation of liquid can also be effected by supplying heat to the trapped vessel, either in cooperation with or instead of the pressure reduction. Use of a programmable logic controller enables a cyclic operation that traps liquid from entering the pump, removes the trapped liquid as vapor, and then resumes normal purge operation.

23 Claims, 1 Drawing Sheet

SELF-CLEANING VACUUM PURGE SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to a method of clearing liquid from a vacuum purge system in a manner that protects the vacuum pump from becoming flooded with liquid. In another aspect it relates to apparatus including a vacuum pump capable of purging a vapor space also containing liquid without flooding the pump.

Vacuum pumps are often used to transfer fluids from one location to another and provision must be made to prevent any liquid present from entering the pump causing it to flood and shut down. Unless very expensive vacuum pumps are used, such flooding can also damage the pump, requiring repair or replacement. In the prior art a number of strategies have been used to protect a vacuum pump from becoming disabled in this way. In general, such measures provide some protective device such as a shut-off valve or a liquid trap capable of detecting the presence of liquid near the pump inlet and closing the line leading to the pump before liquid can reach it. The liquid is then drained away, either automatically or manually.

U.S. Pat. No. 3,612,089, Beguiristain (1971) describes an oral evacuator that would be used by a dentist. A suction pump or fan creates a vacuum that draws air, water and tooth chips from a patient's mouth into a collection chamber that traps liquid and solids, preventing them from entering the suction source. A buoyant valve ball closes the chamber outlet at a high liquid level, thereby cutting off suction to the chamber. A drain valve in the chamber automatically opens to empty the chamber upon sensing a loss of vacuum.

U.S. Pat. No. 3,601,140, Hooper (1971) discloses a similar system that could be used for dispensing beverages in an automobile, using the engine's induction manifold as a vacuum source. Liquid is drawn from a storage container by the application of a vacuum through a chamber that serves as a trap to prevent liquid from entering the engine manifold. A drain valve in the trap is closed by the application of a vacuum and opens automatically when the vacuum is terminated, such as by turning off the engine. An additional safety valve is provided for closing the vacuum line in case any liquid should pass from the trap into the suction line.

U.S. Pat. No. 3,827,452, Baumgarten (1974) describes an automatic shut-off valve that protects a vacuum pump from flooding by closing the passage leading to the pump. In case liquid floods the valve, a flotation needle member inside the valve is forced into the passage leading to the pump, blocking any liquid from the pump intake. The system also has one or more liquid traps that require manual replacing when they are full. The shut-off valve is a safety measure to protect against human error. This system was developed especially for use in medical facilities.

While the above described systems may be suitable for their respective purposes, they are not suitable for purging chemical vapors which may be toxic in nature or require either recovery or special treatment prior to disposal. For example, Hooper contemplates draining his liquid trap beneath the automobile whenever the engine is turned off. Baumgarten describes manual replacement of the traps when they become full, thereby exposing an operator to whatever liquid they contain. The liquid evacuated according to the system of Beguiristain is primarily water that could be drained into the city sewer.

In the chemical process industry it is frequently necessary to purge process equipment such as reactors and treatment chambers between batch operations, storage and transfer vessels after they have been emptied, and process lines through which chemicals have passed. Purging can be carried out by using an inert sweep gas, such as nitrogen, but this technique substantially increases the volume of gas and vapor that must be treated prior to disposal. The amount of purge gas can be reduced or eliminated by evacuation of the zones requiring purge, and vacuum pumps are suitable for this service. In such a system residual chemical vapors and liquid clinging to wall surfaces are withdrawn from the purge zones and any liquid present is vaporized under the subatmospheric pressure produced by the vacuum pump. For a number of reasons generally stemming from process upsets, equipment failure or human mistakes, excess chemical liquid can be present in the evacuation lines leading to the vacuum pump. The simple use of a liquid trap or safety valve to protect the pump, as in the references given above, is not adequate if one is to avoid exposing workers to hazardous chemicals, risking expensive downtime for the operation, or releasing toxic or noxious fumes into the environment.

A solution to the above-described problems within the chemical industry is sorely needed and it is to this need that the present invention is addressed.

BRIEF SUMMARY OF THE INVENTION

According to the method of our invention, an improvement is provided in a vacuum purge fluid flow system in which vapors are withdrawn from a purged volume through a vacuum pump. The invention protects the vacuum pump from being flooded by liquid that can accompany these vapors by the following steps:

(a) Any liquid that would otherwise enter the pump is collected in a trap reservoir positioned in the purge system between whatever volume is being purged and the vacuum pump.

(b) The presence of liquid in the trap which might be drawn into the pump is detected, and (c) in response to detecting such liquid, the conditions of pressure or temperature or both pressure and temperature within the trap reservoir are sufficiently altered so that liquid present in the trap is vaporized and passed through the vacuum pump as vapor.

This procedure can be carried out manually, but is preferably automated in order to reduce the possibility of human error. For example, the presence of liquid in the trap can be observed through a window by an operator who can then manually reduce the absolute pressure in the trap or increase the temperature in the trap by application of heat, or both, in order to vaporize the liquid observed. The vacuum pump continues to operate and chemical vapors are passed through the pump to whatever recovery or disposal procedures are chosen. The preferred manner of reducing the pressure in the trap is by restricting the flow of chemical to the trap while maintaining operation of the vacuum pump.

In a method of operating the invention which is particularly advantageous for purging chemicals in the fabrication of semiconductors, upon detection of a given quantity of liquid in the trap, flow into the trap is totally stopped until sufficient liquid has been vaporized and exhausted through the vacuum pump. At this point flow to the trap is resumed until liquid is again detected whereupon flow is again stopped, and so on, repeating this cycle until liquid no longer enters the trap with the purged vapors. In this manner chemical liquids in the purge line caused by a temporary process upset can be handled efficiently and safely removed from the system.

The apparatus of our invention can be used to practice the above described method and includes in operative relationship the following features in fluid communication with a confined volume from which chemical vapors are to be purged:

(a) a vacuum purge pump having an inlet and an outlet, (b) a conduit for fluids connecting the volume to be purged with the inlet of the vacuum pump, (c) a trapping vessel positioned to form a part of the conduit between the purge volume and the pump inlet, this trapping vessel having a configuration which causes liquid passing into it to be separated from vapor and collected in the vessel, (d) a liquid detector positioned to detect a predetermined quantity of liquid in the trapping vessel, (e) means for causing vaporization of liquid within the vessel by the reduction of absolute pressure in and/or the introduction of heat to the vessel, and (f) a controller capable of developing a signal indicative of liquid in the vessel operatively connected to the detector (d) and the vaporization means (e) to stimulate vaporization of liquid in the vessel upon the detection of a quantity of liquid therein.

The preferred means for reducing the absolute pressure within the trapping vessel is a control valve in the conduit between the purge volume and the trap. This valve can be partially or fully closed to restrict passage of fluid into the trap while the vacuum pump continues to operate, thereby drawing down the pressure in the trap. The means for introducing heat to the trap can be used alone or in cooperation with the means for reducing pressure in the trap. Also, the means for reducing pressure in the trap can be used alone, without the addition of heat. One or the other of these elements must be present in the means of item (e) for vaporizing liquid in the trap, or both elements can be present and controlled to act in cooperation to produce the desired result.

This apparatus can also be adapted to practice the cyclic procedure in which the control valve is repeatedly closed and opened upon detecting the presence and absence, respectively, of predetermined quantities of liquid in the trap. The controller in this embodiment can be a programmable logic controller (PLC) adapted to carry out this cyclic operation.

DETAILED DESCRIPTION OF THE INVENTION

Figure 1:
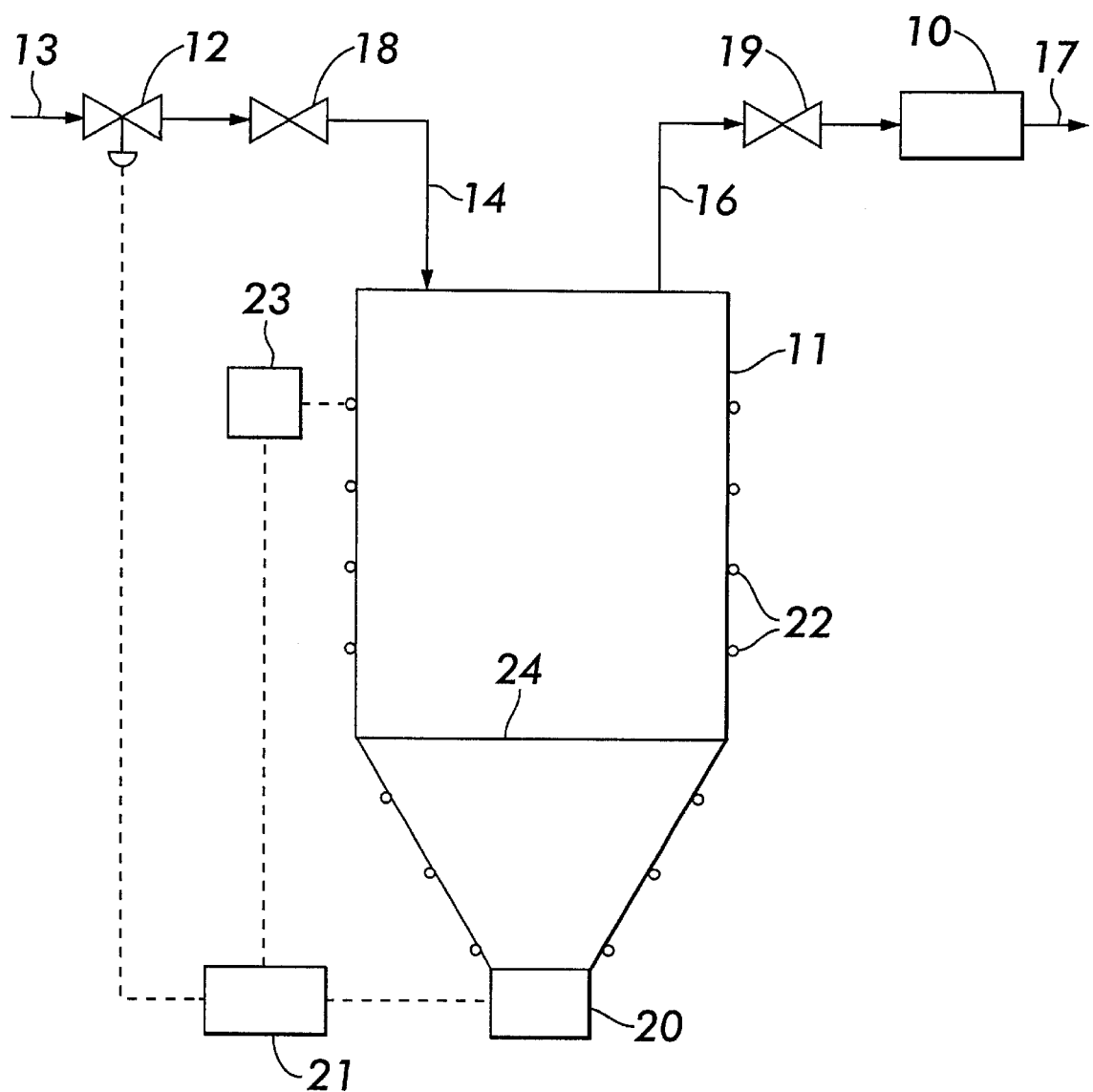
FIG. 1 is a schematic illustration of the apparatus features of the invention, showing their relationship to one another in the process flow sequence.

Although our invention can be used effectively in any evacuation purge operation using a vacuum pump as a suction source, it is particularly of advantage in chemical processes involving chemicals that require special handling. One such process is semiconductor fabrication that requires use of very expensive equipment and a highly skilled labor force. In such operations, production downtime has a considerable impact on product cost and our invention helps reduce lost production time by enabling purge systems to operate more effectively. These fabrication methods are basically batch processes using a variety of chemicals and requiring a vacuum cycle purge operation to clear process tools and conduits of residual chemicals between cycles.

The vacuum pumps of choice are diaphragm pumps having a very low tolerance for liquid ingestion. These pumps are usually damaged if liquid does enter them and this frequently requires shutting down the entire operation until the pump can be replaced. Traps of various kinds have been used in order to protect these pumps by collecting liquid that would otherwise enter the pump, but this introduces another problem of how to handle the liquid chemicals once they accumulate. This invention provides a system that clears the trap of liquid while continuing to purge the vacuum lines of liquid without causing pump damage or excessive downtime.

Our invention detects liquid if it flows into the trap, stops or restricts the flow of all fluid, liquid and vapor, into the trap, and/or applies heat to the liquid in the trap so as to vaporize the liquid in the trap, and then evacuates the resulting vapor through the vacuum pump. Normally the chemicals purged in this manner must either be recovered or treated to permit their disposal without harm to the environment or personnel. By evacuating liquid from the trap as vapor through the pump, the system makes use of whatever recovery or treating operation already exists and does not create new problems of disposal.

Examples of chemicals used in the semiconductor industry that can be purged and handled by the invention include photoresist solvents, developers, and the like, for example, tetraethylorthosilane (TEOS). Standard methods of disposal for such chemicals include water scrubbers, burn boxes, carbon filters, and the like. It should be understood, however, that the invention has broad application for the handling of any liquid process chemical and is not limited to the handling of any specific substance. Under ideal operating conditions, such chemicals are not present in liquid form in the purge stream passing to the vacuum pump, but because of equipment failures, such as faulty valves, and human mistakes, it is not unusual for liquids to be present in the lines.

Referring now to the drawing, FIG. 1, a vacuum pump 10 is shown connected through trap 11 to control valve 12. The inlet of valve 12 is connected by conduit 13 to whatever volume of process equipment is being purged of chemical residue. As pump evacuates the volume being purged, chemical vapor that also can contain liquid passes through conduit 13, valve 12 and conduit 14 into trap 11. Trap 11 is sized and configured so as to separate liquid from the vapor, the liquid being collected in the lower portion of trap 11. The design and construction of liquid traps is well known in the art and is not a feature of this invention. Any standard trap design used in the industry to protect diaphragm vacuum pumps is suitable.

Vapor thus separated from any liquid entering trap 11 passes through conduit 16 to the inlet of pump 10. The outlet of pump 10 exhausts into conduit 17 that can lead to whatever recovery or disposal system is in use by the plant. Valve 18 in conduit 14 and valve 19 in conduit 16 are merely gate valves which permit isolation of trap 11 in the event the trap needs to be removed for repair or replacement.

A liquid detector 20 is located at or near the bottom of trap 11 to detect a predetermined quantity of liquid accumulated in the trap. Detector 20 is operatively connected to controller 21 that, in turn, is connected to control valve 12. Preferably these instruments are connected electronically through suitable wiring, indicated in FIG. 1 by broken lines, but a mechanical or a radio frequency connection can be used. For example, the liquid detector could be a ball float connected by a control arm to the control valve in such a way that the valve is biased toward a closed position as the ball float rises in the liquid accumulated in trap 11. Although detector 20 and controller 21 are shown as separate instruments, they can be one piece of equipment that is designed to operate valve 12 in response to the detection of a given liquid quantity in trap 11.

As shown in FIG. 1, trap 11 is equipped with a heat source such as resistance cables 22 that wrap around the exterior of trap 11 to provide heat to the trap, aiding the vaporization of any liquid in the trap. Any means to supply heat to the accumulated liquid can be used, such as heating coils positioned outside or inside the trap or an external jacket through which a heating fluid can be passed to supply the required heat. This heat supply is controlled by regulator 23 operatively connected to controller 21 which, in this case, has temperature control capability communicating with a temperature sensing element in liquid detector 20.

Broken line 24 in FIG. 1 shows one possible position for location of a mirrored surface that can be used in connection with an optical liquid detector in case that type of liquid detector is elected to be used. Such a device for detecting small quantities of liquid by reflected or transmitted light is shown in U.S. Pat. No. 5,764,356. Liquid detection electrically using a temperature sensitive resistance element is shown in U.S. Pat. No. 4,706,497. Sensing a liquid chemically with a powder which swells in the presence of liquid causing attenuation of an electrical signal passing through a cable enclosed within a sheath with the powder is shown in U.S. Pat. No. 4,596,443. A ball float to detect liquid level in a trap is shown by U.S. Pat. No. 3,612,089. There are many options available for detecting the presence of liquid and the one that is most suitable will depend upon the nature of the chemical residue being purged, the size of the trap selected for the operation and cost factors.

The liquid detector can be integral with the trap, mounted inside where the liquid is accumulated, or it can be located externally, positioned on the side of the trap or situated to detect liquid level through a clear window in the trap. Such a window or an external level gauge can be used to detect liquid visually in a manual mode of operation. The "window" can be constructed of any material capable of transmitting the wave lengths of light used, including glass, quartz, sapphire, magnesium fluoride, lexan, or any other material capable of transmitting the detecting radiation and strong enough to hold the vacuum within the trap. The detector can be constructed of any of the materials suitable for construction of the trap. The detector can be a mechanical float, optical probe, capacitive probe, a weight scale, in-situ ultrasonic detector, ultrasonic strap-on detector, conductive current detector or any other device capable of detecting the presence of liquid in the trap.

If an optical probe is used to detect the presence of liquid, there are many types of equipment available for such service. In one possibility, a detector tip is angled so that total reflection of a light beam back into the detector takes place when no liquid is present and less reflection occurs when liquid is present. Such devices are used to detect spills in refill systems and other spill containment vessels. Another such device uses a mirror that can be placed inside the trapping vessel. The mirror permits reflection of light when no liquid is present, but due to refraction and diffraction of a light beam returns less light when liquid is present. Such a mirror can be mounted on a tray or screen inside the trap as discussed in connection with FIG. 1. Another optical detector uses a detector that provides a light source on one side of the vessel and a detector on the opposite side of the vessel, such that when liquid is present light is refracted away from the detector and the reduced transmission indicates the presence of a quantity of liquid. Still another possibility is to use a piece of wettable substance, such as "GoreTEX" Teflon or suitable material that is opaque and non-reflective when dry but reflective when wet, such that when liquid is present increased optical reflection occurs.

In the preferred mode of operation of the invention, conditions within the trap are not altered until a predetermined quantity of liquid has been accumulated. This amount can easily be determined empirically and depends upon the vacuum pump capacity, expected liquid flow, heating capability, vapor pressure of the chemical being purged, and the like. This amount should be small enough that the liquid can be quickly vaporized and the evacuation operation returned to normal, but large enough that the system does not cycle too frequently. In some cases, it is desirable to detect liquid at two or more levels so that vaporization conditions can be made more severe as the amount of liquid accumulated in the trap increases. In such an operation control valve 12 can be biased toward closure upon receiving a signal representative of a low level of liquid detected, and completely closed upon detection of a higher level of liquid. In another possible scheme for the invention, heat is added to the trap upon detection of a small amount of liquid and the control valve biased toward closure as the amount of liquid increases. Various combinations of this type of control are within the scope of our invention.

The size of the trap 11 depends upon the particular operation being served by the purge system and factors such as line diameter, pump capacity, the nature of the fluid being purged, exhaust capabilities, chemical toxicity and other related process variables. If large liquid flows are possible, the trap can be very large, accommodating liters or gallons of chemical. In most semiconductor applications the size of the trap will be fairly small, measuring a few inches in diameter and length, but capable of handling chemicals that are air reactive and frequently toxic.

The trap can be made from any material compatible with the chemicals being handled, but must be strong enough to withstand pressure changes while being cycled from deep vacuum to atmospheric pressure. Stainless steel is the preferred material of construction, but other materials can be used. Examples of materials that can be considered include other metals, for example copper, nickel, aluminum monel, Hasteloy, and the like; plastics such as Teflon, Viton, kynar, polypropylene, polyethylene, and the like; and ceramics such as silicon carbide, alumina, diamond, fused quartz, borosilicate glass, plain or exotic glasses, and the like. Combinations of these materials, such as glass-lined steel, can also be used.

In its preferred embodiment the trapping vessel is equipped with means to heat the accumulated liquid. Such heating means can be omitted if the nature of the liquid does not require heat to achieve vaporization but can be vaporized solely by reducing the absolute pressure in the trap. Whether means to reduce the pressure or to add heat, or both, are required depends upon the vapor pressure of the chemicals being purged. Heating means can include resistance heaters mounted inside the trap where they would contact the accumulated liquid or heat tape or cable wrapped outside the vessel positioned to supply heat through the vessel walls. Other heating means include a temperature controlled bath of water or oil, coils or jackets through which a heated fluid such as water or oil can be circulated, infrared heaters or other optical/photonic methods, microwave energy sources, and the like. Heaters can be embedded in the vessel walls or installed internally, as in the case of a cartridge heater, or externally, as in the case of heat tape.

A temperature probe can be provided to help control heat supplied to the trap. This probe can be built into the level detector, mounted on the surface of the trapping vessel or inserted into the vessel separately. Such a probe can include any standard temperature sensing device such as thermocouples, thermistors, infrared detectors, and the like.

The control valve 12 can be operated pneumatically, hydraulically, electrically, mechanically or manually. In its automatic more of operation, the valve is connected to an actuating circuit or device that communicates with the liquid level sensing system associated with the trapping vessel. This actuating system can be as simple as a current passing through a contact that is directly controlled by the electronics of the liquid level detector. The actuating system can also be as sophisticated as a microprocessor control system that integrates the various functions required, such as temperature control, pressure control, valve position, liquid level, and the like. The valve can be constructed of any of the materials listed for the trap and combinations of such materials can also be used. In case two or more volumes are being purged simultaneously, multiple control valves in multiple lines leading to the trap can be used. Alternatively, in such cases single multi-port or multi-actuator valves can be used, depending on the specific characteristics required for a particular process. In like manner, multiple vacuum pumps can be connected to a single trap.

The controller 21 can be a simple circuit in which the liquid level sensing device 20 pulls a relay contact into the closed position when no liquid is present, allowing current to flow to control valve 12. This current activates a normally closed valve 12, opening it and keeping it open as long as no liquid is detected at the required level. When liquid is present indicating an accumulation of liquid, the detector 20 opens the contact in controller 21 removing power from valve 12, allowing it to close. This method of operation has the advantage of being fail-safe because valve 12 will close in the event of power loss, failure of liquid level detector 20, liquid level in the trap reaching its predetermined value, or other non-standard vacuum condition. Using a normally open valve for control valve 12, or a valve that can operate in a number of intermediate positions between fully open and fully closed, permits more flexibility of operation but requires more complex controlling circuitry.

A more complex controller 21 can use a microcontroller operatively communicating with the control valve or valves 12, the level sensing device 20, and heating circuits 23. A programmable logic controller can be used for this service. Such a controller can continuously monitor temperature of the trapping vessel and activate the heating means and sound an alarm if condensation is likely to become a problem due to low temperatures. It can also provide a high temperature cutoff. It can monitor vessel pressure and liquid level to determine when complete evaporation has occurred, and can use such data in a database to predict how long each cycle takes in the event the trap becomes flooded. This prediction can then be used to indicate an alarm condition if vessel pressure does not drop to specified values within a given length of time, based on normal desired conditions. This provides an effective vacuum pump monitoring device. Such a microcontroller can include a family of controllers, ranging from single chip microcontrol systems to full general purpose computers. All are suitable for use in practicing the invention. The control system can also be derived from controller hardware associated with an end-user tool, refill system, or intelligent vacuum pump.

A dip tube (not shown) extending into the lower portion of the trap can be included in order to provide for an emergency in which the trap becomes flooded. This situation could develop if liquid flows into the trap flooding it before normal operations can clear the trap by vaporizing the liquid and removing the vapor through the vacuum pump. In such an event liquid can be drawn off through the dip tube into a separate vessel.

The trap can also be equipped with a vacuum/pressure detection probe of any style. Such a probe can be used to confirm the presence of liquid, monitor the rate of evaporation, confirm the operation of the vacuum pump during the evaporative stage of the operation, and provide for any sort of safety shutdown and control procedure that may be required.

This invention is unique in its ability to repetitively trap and evaporate liquids that are present in a vacuum line and in this way provide a "self-clearing" system. By controlling temperature and monitoring pressures the trap clearing cycles can be accelerated and automated to suit any vacuum purge operation. Whether adapted for automatic or manual use, the invention eliminates the need for an operator to disassemble the trap protecting the vacuum pump. This advantage is particularly valuable when handling potentially hazardous chemicals because the invention prevents leakage problems associated with repetitive trap disassembly, and eliminates downtime and other risks involved in removing key elements of a vacuum purge system.

Other embodiments, advantages and features of our invention will be apparent to those skilled in the art from the foregoing disclosure and following claims without departing from the spirit or scope of the invention.

What is claimed is:

1. In a vacuum purge fluid flow system in which vapors are withdrawn from a purged volume through a vacuum pump, the method of protecting the vacuum pump from being flooded by liquid accompanying said vapors which comprises:

(a) collecting in a trap reservoir positioned in said system between said purged volume and said pump any liquid which would otherwise enter said pump, (b) detecting in said trap the presence of liquid which might be drawn into said pump, and (c) changing the conditions of pressure or temperature or both pressure and temperature within said trap reservoir so that liquid present is vaporized and passed through said pump as vapor.

2. The method of claim 1 wherein said detecting step (b) automatically produces a signal, which induces the changing of conditions according to step (c).

3. The method of claim 1 wherein step (c) is carried out by at least partially restricting the purge flow from said volume to said trap so as to reduce the pressure within said trap causing vaporization of liquid therein.

4. The method of claim 3 wherein heat is also applied to said liquid in said trap to assist in its vaporization.

5. The method of claim 4 wherein pressure and temperature within said trap are continuously monitored and responsive signals are developed to help control said restriction of purge flow and said application of heat to said trap.

6. The method of claim 3 wherein said purge flow from said volume to said trap is totally stopped upon the detection of a predetermined amount of liquid in said trap and remains stopped until a required vaporization of liquid in said trap has been accomplished after which purge flow is resumed.

7. The method of claim 6 wherein steps (a), (b) and (c) are repeated in a cycle as needed to completely remove the liquid accompanying vapors from said purged volume.

8. The method of claim 1 wherein step (c) is carried out by applying heat to liquid present in said trap causing vaporization of at least a portion of said liquid.

9. The method of claim 1 wherein the exhaust from said vacuum pump is passed to a discharge treatment process enabling safe disposal of chemicals present.

10. Apparatus for purging from a confined volume vapors in a fluid stream that can from time to time also contain liquid comprising:
   (a) a vacuum purge pump having an inlet and an outlet,
   (b) a conduit for fluids connecting said volume with the inlet of said pump,
   (c) a trapping vessel positioned within said conduit between said volume and said pump inlet, said vessel having a configuration which causes liquid passing into it to be separated from vapor and collected in said vessel,
   (d) a liquid detector positioned to detect a predetermined quantity of liquid in said vessel,
   (e) means for causing vaporization of liquid within said vessel by the reduction of pressure in and/or the introduction of heat to said vessel, and
   (f) a controller capable of developing a signal indicative of liquid in said vessel operatively connected to said detector (d) and said vaporization means (e) to stimulate said vaporization upon said detection of said quantity of liquid.

11. The apparatus of claim 10 wherein said vaporization means (e) is a valve within said conduit positioned between said volume and said vessel, said valve being capable of restricting, including stopping, fluid flow to said vessel during continued pump operation and thereby reduce the pressure in said vessel.

12. The apparatus of claim 11 having an auxiliary heater capable of supplying heat energy to liquid collected in said vessel and also operatively connected to said controller.

13. The apparatus of claim 12 wherein said controller is programmed to monitor temperature within said vessel and activate said auxiliary heater to supply heat to said vessel in order to prevent vapor condensation due to low temperature.

14. The apparatus of claim 11 wherein said controller is a programmable logic controller.

15. The apparatus of claim 14 wherein said valve is normally closed but biased in an open position in the absence of a liquid level signal from said controller, and said controller is programmed to cycle repeatedly to close said valve as long as liquid is detected in sufficient quantity in said vessel and reopen said valve as soon as said detector fails to detect said predetermined quantity of liquid.

16. The apparatus of claim 11 wherein said controller is programmed to monitor vessel pressure and liquid level over time and sound an alarm if vessel pressure does not drop to specified values within a given period of time.

17. The apparatus of claim 10 wherein said vaporization means is a heater capable of supplying heat energy to liquid collected in said vessel.

18. The apparatus of claims 17 or 12 wherein said heater is an electrical resistance cable positioned on said vessel.

19. The apparatus of claim 10 in which the outlet of said pump is connected by a conduit for vapor to a treatment and disposal system.

20. The apparatus of claim 10 wherein said liquid detector is a float device.

21. The apparatus of claim 10 wherein said liquid detector is an ultrasonic device.

22. The apparatus of claim 10 wherein said liquid detector is a capacitance device.

23. The apparatus of claim 10 wherein said liquid detector is an optical device.

* * * * *